Patented Nov. 27, 1923.

1,475,574

UNITED STATES PATENT OFFICE.

WILLIAM H. GESELL, OF MONTCLAIR, NEW JERSEY.

EDIBLE PRODUCT AND PROCESS OF MAKING THE SAME.

No Drawing.   Application filed April 8, 1921.   Serial No. 459,681.

*To all whom it may concern:*

Be it known that I, WILLIAM H. GESELL, a citizen of the United States, residing at Montclair, in the county of Essex and State of New Jersey, have invented certain new and useful Edible Products and Processes of Making the Same, of which the following is a specification.

This invention pertains to food products, and, more particularly, to a basic composition or product adapted, more especially, for use in the manufacture of oleomargarine or butter substitutes.

Speaking generally, the object of the invention is to enable butter substitutes to be produced in a simple, expeditious and economical manner, without necessitating the employment of churns or other more or less complicated apparatus usually employed in the manufacture of these products, and, moreover, permit of the production of superior butter substitutes so far as regards permanency, palatability, appearance, dietetic value and desirable characteristics generally.

The salient feature of the invention consists in the employment or utilization of either cetyl alcohols, or the esters of cetylic acids, or mixtures of either or both, or their equivalents, to effect the mixing or emulsion of the basic ingredients entering into butter substitutes.

In practically carrying out the invention, I start with any suitable edible oil or fat, either vegetable or animal, or mixture or mixtures thereof, such as cocoanut, cotton seed, maize, peanut, sesame, sunflower, olive, lard, tallow, butter fat, etc., or their hydrogenated products, or any mixture thereof, and mix therewith the specified cetyl agent or compound, e. g., a cetyl alcohol, in the proportion by weight, preferably, of from ¼ (one-fourth) to 1 (one) per cent. The mixture having been brought to uniformity by mixing or agitation, it constitutes a basic product for use in the manufacture of butter substitutes. All that is necessary to transform the product into a butter substitute is to add thereto a suitable quantity of milk in any form, such as whole or skim milk, malted milk, cream, powdered milk products, butter, etc., or mixtures thereof, and bring about a thorough emulsification of the mixture, which can be expeditiously accomplished by simple mixing or agitation. I prefer to employ from 18 to 25%, by weight, of whole milk or a substantially equivalent quantity of one of the other lacteal bodies. If the dried products are used, it is preferable to first mix them with water. It is not necessary, though it is preferable, to use one of the milk bodies specified, since water alone can be permanently incorporated into the basic product by simple mixing.

Either the basic or the finished product can be colored or flavored as desired, and salt may or may not be used, all depending on the specific characteristics sought to be attained in the ultimate product or composition.

The cetyl agents specified, because of their remarkable emulsifying properties, enable me to produce the important results adverted to as well as others.

It is preferred to market the basic product, as it is of a very permanent character, since it is comparatively free from fatty acids or nitrogenous agents, and, accordingly, will not ferment or grow molds. The butter substitute manufacturer, baker or housewife may thereafter use it, preferably in the manner described, to make the ultimate butter substitute.

It will be understood that the products outlined, and methods of making them, may be modified in details by those skilled in the art without departing from the spirit or substance of the invention, the scope of which is commensurate with the appended claims.

Having thus fully described the invention, what I claim as new and desire to secure by Letters Patent is:

1. The process of emulsifying edible oils and fats which consists in admixing an oil or fat with cetyl alcohol, and thereafter adding milk to the mixture to produce a butter substitute.

2. The process of emulsifying edible oils and fats which consists in admixing an oil or fat with cetyl alcohol, the proportion of alcohol being not greater than one per cent by weight, and thereafter adding milk to the mixture to produce a butter substitute.

In testimony whereof, I have signed the foregoing specification.

WILLIAM H. GESELL.